J. TAYLOR.
WATER WHEEL.
No. 2,249. Patented Sept. 11, 1841.
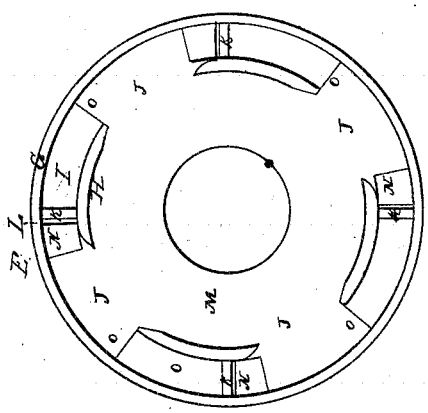
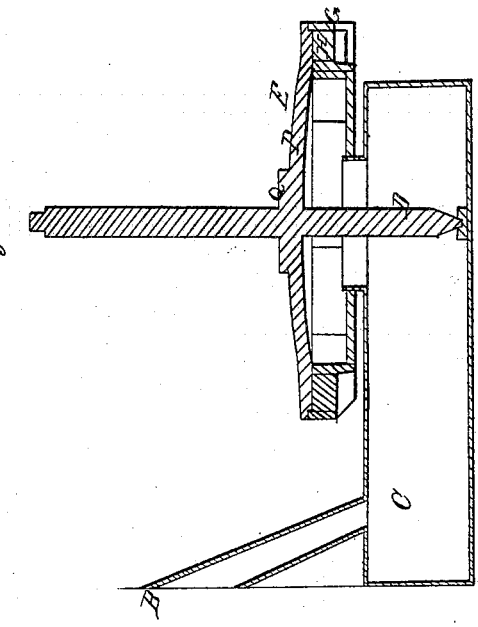
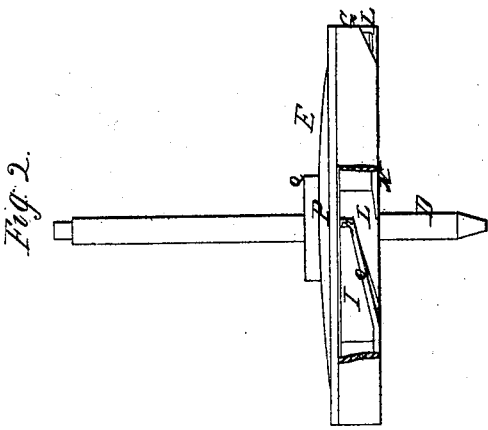

UNITED STATES PATENT OFFICE.

JESSE TAYLOR, OF AURELIUS, NEW YORK.

IMPROVEMENT IN THE CONSTRUCTION OF WATER-WHEELS.

Specification forming part of Letters Patent No. 2,249, dated September 11, 1841.

*To all whom it may concern:*

Be it known that I, JESSE TAYLOR, of the town of Aurelius, county of Cayuga, and State of New York, have invented a new, useful, and Improved Mode of Constructing a Water-Wheel and Applying Water to the Same; and I do hereby declare that the following is a full and exact description.

The nature of my invention consists in applying the water to the wheel by an aperture in the bottom and in the center of the same, the wheel to be covered on the top, or the upper part of the wheel to be closed, not permitting the escape of any water from the top, the wheel to be closed in the bottom, excepting said aperture in the center and apertures in the bottom and near the outer edge of the wheel, through which last apertures the water entering the aperture first above referred to escapes, which apertures are at or near right angles from the center of the wheel, the wheel put in motion and kept in motion by the reaction of the water in escaping from the apertures between the outer and inner rims of the wheel, the wheel to be placed upon a trunk, into which the water descends, said trunk to be close, so as to allow no water to escape from it, excepting through its outlet, which is directly under the center of the wheel, a circular rim or plate to be fastened to the trunk around the aperture in the trunk, which extends upward into the aperture in the bottom of the wheel, the outer edge of said rim or plate to be as near the outer edge of the aperture in the wheel as can be and at the same time not have the said rim or plate obstruct the turning of the wheel, the rim or plate to be firmly fixed upon the trunk, the shaft of the wheel to stand perpendicular to be firmly fixed to the upper part or cover of the wheel, and the lower end to set upon and run in a step or block in the trunk or a bridge-tree in the trunk.

To enable others skilled in the art to make and use my invention, I will proceed to describe its operation and construction, reference being had to the annexed drawings of the same, in which—

Figure 1 is a top view of the wheel without the shaft or cover, in order to show the interior construction. Fig. 2 is a side view of the wheel. Fig. 3 is a sectional view.

The water is let into a chute by a gate B, which chute conveys the water into a trunk C, which trunk may be of any shape and of a size proportioned to the water required, as may be also the chute. The trunk is closed entirely, except an aperture where the water enters it and at an aperture where it escapes from it, in which last-mentioned aperture the lower end of the shaft D of the wheel E enters the trunk. The last-mentioned aperture is of a circular form. On the top of the trunk there is a circular tube, of cast-iron or other metal or wood, firmly attached to the trunk, so as to allow the water to pass from said trunk through said tube into the wheel, and to be of the diameter of the aperture in the center of the bottom of the wheel, into which it passes, but not to fit so tight as to prevent the wheel from turning freely on it.

The wheel E is constructed of two concentric rims G H. The distance or space I between them is to be diminished or increased in proportion to the amount of water required, as are also the height and thickness of the rims. The outer rim G of the wheel is entirely solid. The inner rim H is open at intervals J to admit the water to pass from the center of the wheel to the buckets and issues near the circumference, which are in the space I, before mentioned, between the rims. The outer rim is deeper than the inner rim, in order to fit into a groove in the top. From the inner rim to the outer rim, radiating from the center of the wheel, heads K are placed and secured to the inside of the rims, which may be placed at any required distance from either end of the sections of the inside rim, but which should be placed nearer one end of each section than the other, which heads are level with the top of the inner rim, but extend down only half their depth, and under which are formed the issues L, the depth of said heads being more or less, in proportion to the quantity of water required to be used. Those heads are placed perpendicular in the wheel and are all of the same height.

The bottom M of the wheel is of wood, cast-iron, or any suitable metal, and is of the same diameter as the outer rim of the wheel, and may be of any thickness. The outer and inner rims are firmly attached to the bottom of the wheel by bolts, screws, or otherwise. The bottom of the wheel, from the ends of the sections of the inner rim of the wheel to the outlet of the wheel, is inclined downward, as at N, at an inclination of half an inch to a foot, more or less, in proportion to the thickness of the bottom of the wheel, until the inclination reaches a line perpendicular with the side of the aforesaid head nearest to said inclination. Next the side of the heads opposite the inclination above mentioned, and in the spaces I, are formed inclined planes O, of plank or cast-iron or other material, attached to the rims, and the said plank inclines at an angle of half an inch to a foot, more or less, until it reaches the section of the inner rim farthest from head. The bottom of the last-mentioned inclined plane O, where it is attached to the head, is at the same distance from the lower side of the bottom of the wheel as is the lower edge of said head. The shape of the sections of the inner rim are of the form represented in Fig. 1.

Four or more apertures are made in the bottom of the wheel, in the space between the rims, according to the quantity of power or water required, for the purpose of discharging from the wheel the water passing into the same through the tube.

The top P of the wheel above described is of wood, cast-iron, or other material, and is of any required thickness, and is securely fastened to said wheel by bolts, screws, or otherwise, and is of the same diameter as the bottom above described. Around the outer edge of the lower side of the top there is a groove of a width equal to the thickness of the outer rim, and the inner rim is as much lower than the outer as the depth of the groove. From the point where the inner side of the inner rim joins the top toward the center the top may be slightly convex on the outside and concave on the under side. It may, however, be flat. On the center of said top I place the hub Q, and firmly fasten the same to the top, through which I place a shaft D, which is firmly fixed in said top and hub, which is larger or smaller, in proportion to the power required, and which is of wood, cast-iron, or other metal.

The advantages of this wheel over others are: that by discharging the water through the bottom it does not obstruct the motion of the wheel, as it would if discharged from the top or sides; that it will run though entirely covered with water; that all the water which enters the wheel has an effect in propelling it; that the cost of the wheel is smaller than that of other wheels; that the motion of the wheel is more steady and regular; that it requires less water than other wheels, and that the water lifts the wheel, and consequently takes off the friction and wear of the shaft in the step.

What I claim as my invention, and which I desire to secure by Letters Patent, is—

The before-described construction of the water-wheel, in combination with the trunk, collar, and chute for admitting the water through the center of the bottom of the wheel to the interior thereof and causing it to escape near the circumference through small apertures, which has the effect of turning the wheel in a contrary direction to that of the escape of the water—that is to say, combining with the trunk, collar, and chute, as aforesaid, a hollow drum or wheel constructed with a circular rim and a concavo-convex head fixed to said rim, and to which head the shaft is fixed, and with a bottom which is also fastened to the said rim, with a circular aperture in the center of said bottom for the admission of water and a series of small apertures near its periphery in a circle concentric with the circle of the center aperture for its discharge, the interior being hollow, with a rim made in segments of less diameter than the outer rim, arranged in a circle concentric with the outer rim, forming a space between the two rims, in which are arranged inclined planes over the before-mentioned small apertures, the approach to which is also inclined planes formed on the bot'om, over which vertical heads are fixed, between which and the last-mentioned inclined planes the water passes to the issues from the center of the wheel through spaces in the inner segment-rim, as before described.

JESSE TAYLOR.

Witnesses:
EDWARD ALLEN, Jr.,
WILLIAM ALLEN.